UNITED STATES PATENT OFFICE.

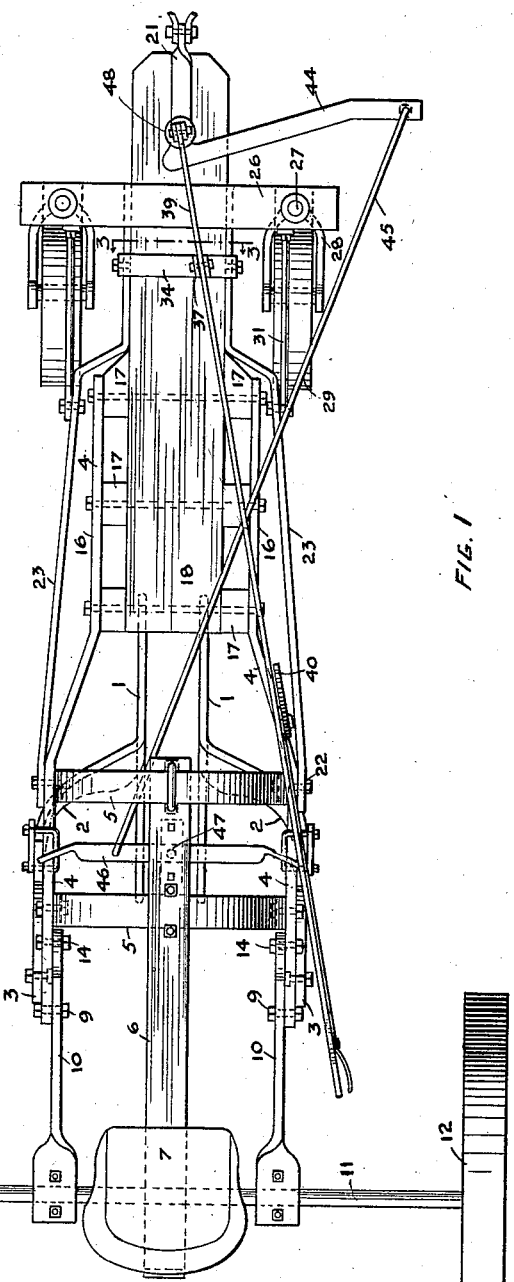

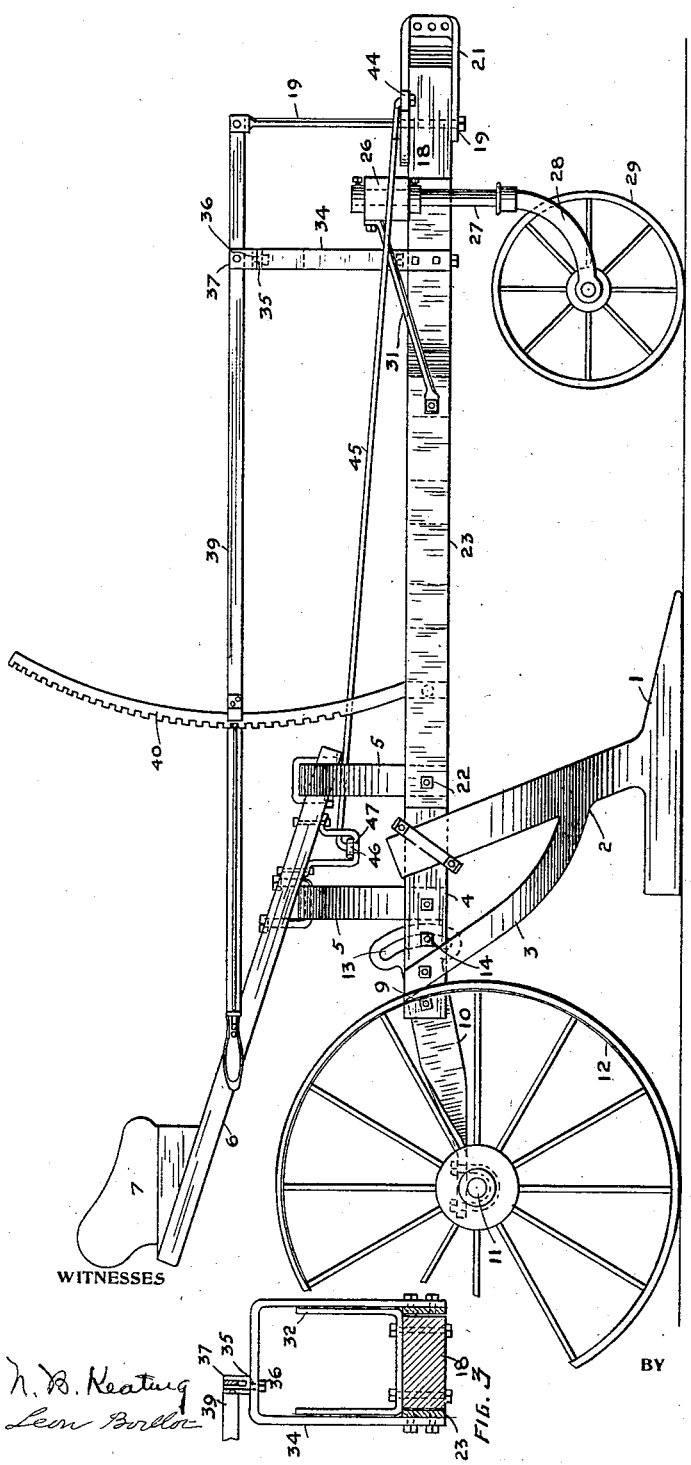

LEWIS E. FENTON, OF SALINAS, CALIFORNIA.

BEET-PLOW.

1,069,118.  Specification of Letters Patent.  Patented Aug. 5, 1913.

Application filed October 8, 1912. Serial No. 724,573.

*To all whom it may concern:*

Be it known that I, LEWIS E. FENTON, a citizen of the United States, residing at Salinas, in the county of Monterey and State of California, have invented new and useful Improvements in Beet-Plows, of which the following is a specification.

The present invention relates to improvements in plows for pulling beets, and the object of the invention is to provide a beet plow in which the plow shares can be raised out of the ground when desired, as for turning at the end of a row of beets, and also in which the direction of the plow can be readily changed, as when it is required to direct the plow along a curved or crooked row of beets.

In the accompanying drawing, Figure 1 is a plan view of my improved beet plow; Fig. 2 is a side elevation thereof; Fig. 3 is a sectional view of a detail.

Referring to the drawing, 1 indicates the plow shares, which are spaced apart a suitable distance, as is usual, to permit the beets to pass therebetween and to remove them from the ground, being suitably curved at their rear portions 2, as shown. Said rear portions 2 have rearward extensions 3, and said portions are clamped and the extensions are bolted to side bars 4 connected by transverse arches 5, to which arches is secured a rearwardly extending seat frame 6 supporting a seat 7. The rear ends of said bars 4 are pivotally connected as shown at 9, with bars 10, the rear ends of which are connected to the rear axle 11, upon which are rotatably mounted the rear wheels 12. Said bars 10 extend forwardly of said pivots 9, and at their front ends are formed with upwardly extending arcuate slots 13, the bars 4 having therein bolts 14, which can be fixed when desired at any desired point in said slots, although ordinarily they move freely therein. Said bars 4 extend forward of the foremost arch 5, and converge toward one another, and the forwardly extending portions 16 of said bars are secured rigidly to transverse blocks 17 of wood, to which is rigidly secured a wooden inner frame or beam 18. At the front end of said frame is pivoted, as shown at 19 the clevis 21, which is attached to the six-horse evener, by which the plow is drawn over the ground.

To the bars 4 adjacent to the foremost arch 5, are pivoted, as shown at 22, side bars 23 forming an outer frame, which bars 23 converge forwardly and are secured to a transverse wooden beam 26, from which depend the standards 27, to the lower ends of which are rotatably connected rearwardly curved forks 28, supported upon the front wheels 29, which thus move in the manner of ordinary casters. Said transverse beam is also attached to the side bars 23 by stays or braces 31.

Secured to the sides of the outer frame are the sides of a yoke-shaped iron bar 34 and to the said beam 18 is secured the middle of an upwardly directed yoke 32, the sides of which, being between the sides of the yoke 34, guide said beam in its vertical movement. The middle portion of the yoke 34 is formed with an aperture 35, through which extends a vertical bolt 36, on which can horizontally swivel a yoke-shaped holder 37, through which holder passes a lever 39, provided with the usual spring latch and segment 40, of which lever the rear end extends to a point in proximity to a person seated upon the seat, and the front end is pivotally attached to the upper extended end of the pivot 19, said pivot having a collar 48 above the beam 18. Upon depressing the rear end of the lever 39, the front end is raised, thereby also raising the front end of the main beam 18, and raising the front end of the plow shares, so that the plow moves upwardly out of the ground.

Formed rigidly with the clevis is a laterally extending arm 44, pivotally attached at its outer end to the front end of a link or bar 45, the rear end of which is pivotally attached to a foot lever 46, pivoted at its center upon a pin 47 depending downwardly from the seat frame, and suitably formed at the ends to receive the feet of the driver. When either end of said foot lever is pressed, the bar 45 is moved longitudinally, so as to move the clevis to one side or the other of the direct line, and, in consequence, the beam 18 is moved to one side or the other of the draft line of the horses, and likewise the plow shares are moved to one side or the other, thus enabling said plow to follow a curved or crooked line of beets.

When it is desired that the plow should travel upon the road the rear end of the lever 39 is raised as high as possible. The effect is to lower the front end of the beam 18 and the rear end of the beam is then raised, the points of the plow shares then acting as a fulcrum. Since the rear end of the bars 4 is raised, and the rear ends of the bars 10, which are attached to the rear axle, are stationary, the front slotted ends of said bars 10 are raised, so that the bolts 14 move to the bottoms of said slots. When this has been done, said bolts are tightened in said slots, and then, upon depressing the rear end of the lever 39, the effect is to raise the plow shares from off the ground, so that the plow can travel upon the road.

I claim:—

1. In a beet plow, the combination of front wheels, a frame supported thereon, plow shares, a frame supported thereby, a seat supported by said frame, a fulcrum for a lever supported by the front wheel frame, a lever pivoted on said fulcrum, its rear end extending into proximity with the seat, and its front end having a movable connection with the front end of the plow share frame.

2. In a beet plow, the combination of plow shares, a plow frame supported thereon, comprising rearwardly extending bars, a rear wheel frame pivoted to the plow frame, having bars extending forwardly from its pivots, the forward ends of said bars having vertical arcuate slots, bolts passing through said rearwardly extending bars, and engaging said slots, a front wheel frame having bars pivoted to the rearwardly extending bars, a fulcrum on said front wheel frame, a lever pivoted upon said fulcrum, its rear end extending into proximity to said seat, and its front end having a movable connection with the front end of the plow frame.

In testimony whereof I have hereunto set my hand in the presence of two subscribing witnesses.

LEWIS E. FENTON.

Witnesses:
  FRANCIS M. WRIGHT,
  D. B. RICHARDS.

---

Copies of this patent may be obtained for five cents each, by addressing the "Commissioner of Patents, Washington, D. C."